Patented Dec. 1, 1925.

1,563,755

UNITED STATES PATENT OFFICE.

CARL LEONARDT, OF LOS ANGELES, CALIFORNIA.

PROCESS OF MANUFACTURING CEMENT.

No Drawing.   Application filed November 19, 1923.   Serial No. 675,730.

*To all whom it may concern:*

Be it known that I, CARL LEONARDT, a citizen of the United States, and a resident of Los Angeles, in the county of Los Angeles and State of California, have invented certain new and useful Improvements in Processes of Manufacturing Cement, of which the following is a specification.

This invention comprises an improvement in Portland cement which renders mortar or concrete made from it more plastic and workable before setting without affecting its setting quality or its hardness and durability after setting, and also the improved cement which is the product of the process. The mortar made from this cement may be described as more tenacious and spreadable while in the fluent stage so that, for instance, it may be spread thinner and more evenly on a wall or other surface to be coated than ordinary cement mortar.

In carrying out the process I thoroughly mix with ordinary Portland cement a compound to be presently described. The mixing may be done by incorporating the compound in proper proportion with the clinker prior to or during the grinding operation or by mixing the compound with the cement already ground.

As an example, the compound may be prepared as follows: Calcareous material such as limestone, having at least 50 per cent, and preferably from 75 to 85 per cent, of calcium carbonate, is pulverized and then treated with hydrochloric acid, which may be of the ordinary commercial grade commonly known as muriatic acid. To about 18 parts of the ground calcareous material 2 parts of the acid are added, with stirring, thereby producing in the mixture a neutral salt, calcium chloride. When effervescence has ceased 2 parts of asphaltum and 1 part of crude mineral oil are added with constant stirring until all of the ingredients are thoroughly incorporated. There has thus been produced a compound comprising a nonabsorbent filler, neutral in reaction, with each grain coated with an oleaginous film and calcium chloride.

The compound so produced is preferably added to the cement clinker just prior to or in process of grinding, in the proportion of 1 part of compound to 12 parts of clinker to produce the desired plastic cement. As previously stated, the compound may be incorporated with the cement, in the same proportions, after grinding, by thorough mixing, but it is preferable to add it before grinding as an operation is thereby saved and thorough mixing more easily accomplished.

Incidentally the cement so produced has its water proofing quality greatly increased but its chief advantage is that when reduced to mortar in the ordinary way it is much more plastic than common cement mortar and may be worked and spread more easily while its setting quality and its ultimate hardness and durability are not impaired.

The process may be carried out with oil alone instead of asphaltum and oil, but the use of asphaltum is more economical and it is believed to produce better results.

What I claim is:

1. The process of producing a plastic waterproof cement which consists in incorporating with cement a mixture comprising a finely-divided, neutral, non-absorbent filler having its grains coated with calcium chloride and oleaginous material.

2. The process of producing a plastic waterproof cement which consists in incorporating with cement a mixture comprising grains of calcium carbonate coated with calcium chloride and oleaginous material.

3. The process of producing a plastic waterproof cement which consists in incorporating with cement a mixture comprising grains of calcium carbonate coated with calcium chloride and a mineral oil.

4. The process of producing a plastic waterproof cement which consists in incorporating with cement a mixture comprising grains of calcium carbonate coated with calcium chloride, a mineral oil, and asphaltum.

5. The process of producing a plastic waterproof cement which consists in first treating calcareous material containing calcium carbonate with hydrochloric acid, adding oleaginous material to the mixture, and then incorporating the resulting mixture with cement.

6. The process of producing a plastic waterproof cement which consists in first treating calcareous material containing calcium carbonate with hydrochloric acid, adding mineral oil to the mixture, and then incorporating the resulting mixture with cement.

7. The process of producing a plastic waterproof cement which consists in first treating calcareous material containing calcium carbonate with hydrochloric acid, adding mineral oil and asphaltum to the mixture, and then incorporating the resulting mixture with cement.

8. The process of producing a plastic waterproof cement which consists in first preparing a mixture of calcareous material containing at least 50% calcium carbonate, hydrochloric acid, and oleaginous material and then incorporating this mixture with cement.

9. The process of producing a plastic waterproof cement which consists in first preparing a mixture of calcareous material containing at least 50% calcium carbonate, hydrochloric acid, and mineral oil, and then incorporating this mixture with cement.

10. The process of producing a plastic waterproof cement which consists in first preparing a mixture of calcareous material containing at least 50% calcium carbonate, hyrochlodic acid, mineral oil and asphaltum, and then incorporating this mixture with cement.

11. The process of producing a plastic waterproof cement which consists in first preparing a mixture substantially 18 parts of pulverized calcareous material containing at least 50% of calcium carbonate, 2 parts of hydrochloric acid, and 3 parts of oleaginous material, and then incorporating this mixture with cement.

12. The process of producing a plastic waterproof cement which consists in first preparing a mixture of substantially 18 parts of pulverized calcareous material containing at least 50% of calcium carbonate, 2 parts of hydrochloric acid, 1 part of crude mineral oil, and 2 parts of asphaltum, and then incorporating this mixture with cement.

13. The process of producing a plastic waterproof cement which consists in first preparing a mixture of substantially 18 parts of pulverized calcareous material containing at least 50% of calcium carbonate, 2 parts of hydrochloric acid, 1 part of crude mineral oil, and 2 parts of asphaltum, and then incorporating this mixture with Portland cement in substantially the proportion of 1 part of the mixture to 12 parts of cement.

14. The process of producing a plastic waterproof cement which consists in first treating pulverized calcareous material containing at least 50% of calcium carbonate with hydrochloric acid, adding oleaginous material, and then incorporating the resulting mixture with cement clinker during the grinding operation.

15. The process of producing a plastic waterproof cement which consists in first treating substantially 18 parts of pulverized calcareous material containing from 75% to 85% calcium carbonate with about 2 parts of commercial muriatic acid, adding about 3 parts of oleaginous material, and then incorporating the resulting mixture with Portland cement clinker during the grinding operation in substantially the proportion of 1 part of the mixture to 12 parts of clinker.

In testimony whereof I hereunto affix my signature.

CARL LEONARDT.